Figure 1:
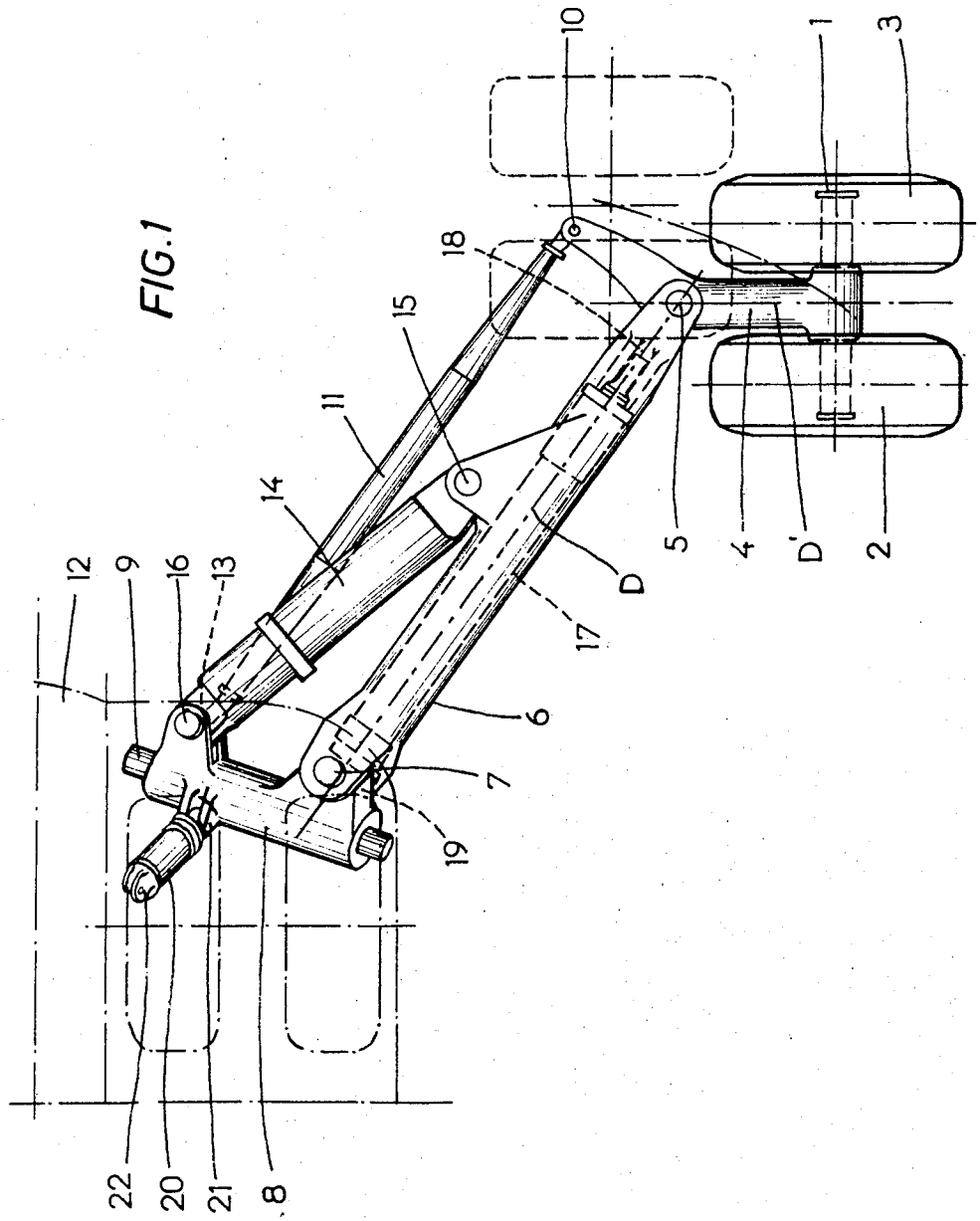

United States Patent [19]

Lucien et al.

[11] 3,807,667
[45] Apr. 30, 1974

[54] LATERAL LEVER FUSELAGE UNDERCARRIAGE TRAIN FOR AIRCRAFT

[75] Inventors: Rene Lucien, Neuilly-sur-Seine; Andre Turiot, Morsang sur Orge, both of France

[73] Assignee: Messier Hispano, Paris, France

[22] Filed: July 3, 1972

[21] Appl. No.: 268,758

[30] Foreign Application Priority Data
July 5, 1971  France .............................. 71.24496

[52] U.S. Cl. ............................................ 244/102 R
[51] Int. Cl. ............................................ B64c 25/14
[58] Field of Search ....... 244/102 R, 100 R, 102 SL

[56] References Cited
UNITED STATES PATENTS

| 2,963,246 | 12/1960 | Mitrovich | 244/102 R |
| 3,526,375 | 9/1970 | Stearman | 244/102 R |
| 3,346,218 | 10/1967 | Lucien | 244/102 R |

FOREIGN PATENTS OR APPLICATIONS

| 448,983 | 6/1936 | Great Britain | 244/102 R |
| 50,907 | 5/1941 | France | 244/102 R |

Primary Examiner—George E. A. Halvosa
Assistant Examiner—Paul E. Sauberer
Attorney, Agent, or Firm—Waters, Roditi, Schwartz & Nissen

[57] ABSTRACT

An undercarriage assembly for an aircraft comprising a lateral leg lever which is inclined outwardly in the extended position of the undercarriage. The lateral leg lever is pivotably connected at its upper end to a transverse hinge member, which is journalled inside the aircraft and has an oblique axis. A support arm includes a vertical portion which carries at least one wheel and an outwardly and upwardly inclined portion. The lateral leg lever is pivotably connected at its lower end to the upper part of the vertical portion. An independent damper connects the lateral leg lever to the hinge member. A rod is pivotably connected at one end to the free end of the upwardly inclined portion and its other end is pivotably connected to the fuselage of the aircraft at a point spaced from the axis of the hinge member. The pivotal connections of the rod to the inclined portion and to the fuselage form with the pivotal connections of the lateral leg lever to the arm and to the hinge member the corner points of a parallelogram.

6 Claims, 2 Drawing Figures

LATERAL LEVER FUSELAGE UNDERCARRIAGE TRAIN FOR AIRCRAFT

The present invention relates to a retractable landing gear or undercarriage for aircraft, of the type comprising, in an undercarriage extended position, a lateral leg lever which is inclined outwardly and which is pivoted on the one hand on a transverse pivot member on the aircraft and on the other hand on a vertical arm carrying at least one wheel by means of an axle.

In high-wing aircraft, particularly short take-off and landing aircraft, currently called STOL, use is often made of the construction referred to as a fuselage undercarriage train, which comprises the main undercarriage trains which in the retracted position are entirely housed within the fuselage, and also the transverse pivot member for retraction of the trains. However, because of the break in line which occurs, in the undercarriage extended position, between the inclined leg of the train and the vertical arm carrying the wheel or wheels, a single pivot hinge is not suitable, as in such case the wheels are housed within the fuselage obliquely relative to the longitudinal axis of the aircraft, and the effect of this is to increase the space required to house the undercarriage train. The problem is even more complicated in the case of transport aircraft in which the undercarriage trains must be retracted below the floor of the aircraft, that is to say, into a space of reduced height, and also in the case of STOL aircraft, which require a wide track for stability.

An object of the present invention is to overcome these disadvantages and for this purpose, the invention is directed to an undercarriage train of the above-mentioned type which is characterized in that it comprises an independent damper connecting the lateral lever to the transverse pivot member, and a rod which is pivoted on the one hand to the upper end of said arm and on the other hand to the aircraft fuselage, at a point separate from the axis of pivotal mounting of the transverse pivot member on the aircraft.

When the undercarriage is raised, the transverse pivot member and consequently the lateral leg lever and the arm carrying the wheels are moved in rotation about the axis of the transverse member. In this movement, since the point of mounting of the rod on the fuselage is not on the axis of the transverse pivot member, the rod causes the arm and its wheels progressively to tilt around the pivot point on the lateral leg lever. Thus, by virtue of the secondary pivotal mounting of the rod on the aircraft, it is possible to provide a hinge for pivoting the leg on the aircraft, which is positioned inside the fuselage and which permits the wheel or wheels to be housed flat in line with the lateral lever and parallel to the axis of the aircraft.

In a particular embodiment of the invention, in the undercarriage extended position, the points of pivotal mounting of the rod on the arm and the fuselage form, with the points of pivotal mounting of the lateral leg lever on the arm and on the transverse pivot member, the corner points of a parallelogram.

Figure 2:
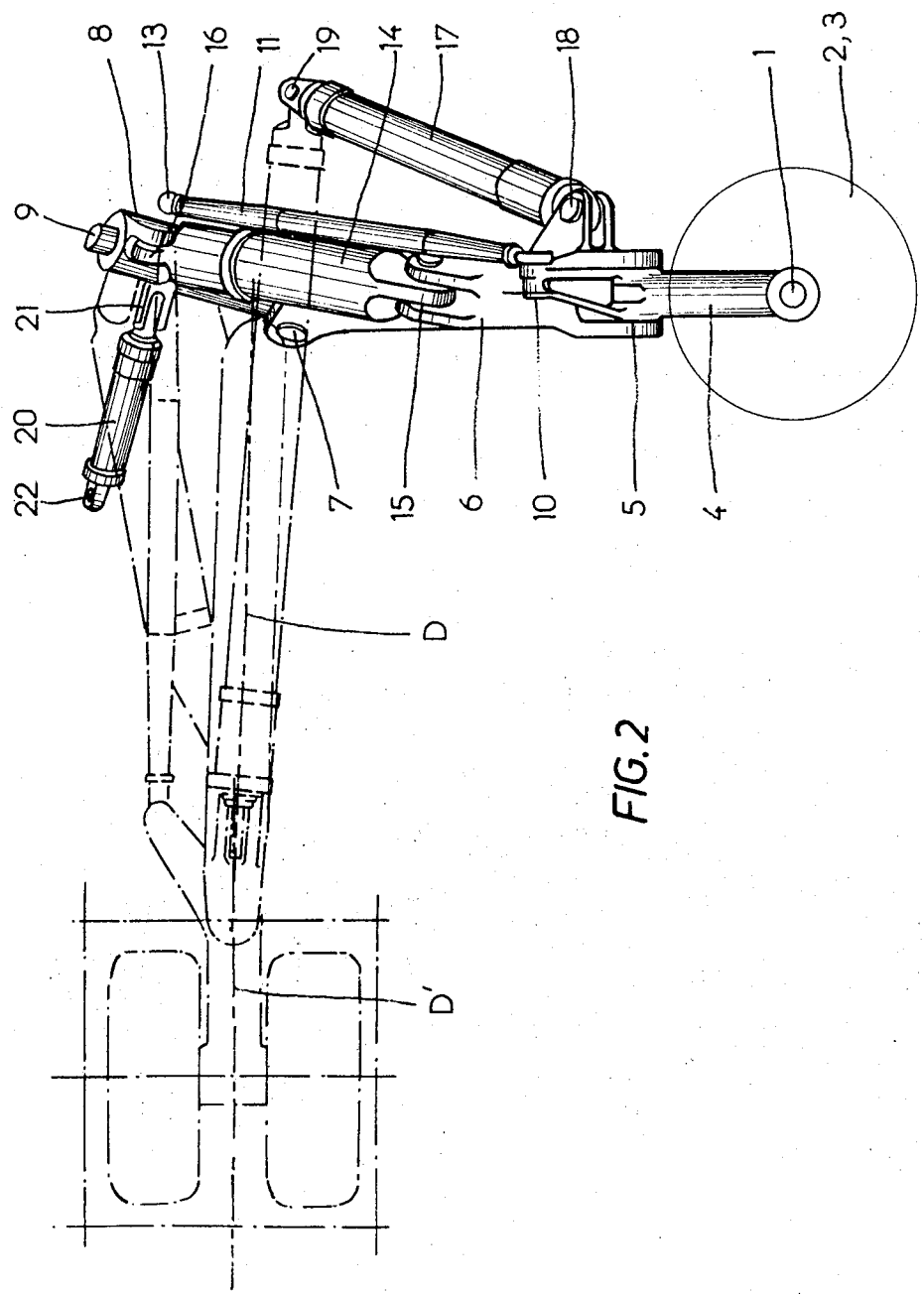

A preferred embodiment of the invention will be described by way of non-limitative example with reference to the accompanying drawings in which:

FIG. 1 is a front view of the left-hand landing gear or undercarriage showing the same in solid lines in the extended position and in chain dotted lines in the retracted position, and FIG. 2 is a side view of the undercarriage showing its two extreme positions in solid and chain-dotted lines.

Referring to the drawings, the landing gear or undercarriage comprises an axle 1 which is common to two wheels 2 and 3 and which is mounted on a vertical arm 4 pivotally carried by means of a horizontal shaft 5 on a lateral leg lever 6 which is inclined relative to the ground. The lever 6 is connected by a shaft 7 to a transverse member 8, the shaft 9 of which forms the pivot hinge of the undercarriage. Pivotally connected at 10 to the upper end of the arm 4 is a rod 11 connected to the aircraft 12 by the connection 13, the pivot points 10 and 13 being so selected that in the undercarriage extended position, they form with the pivot points 5 and 7, substantially the corner points of a parallelogram.

An independent damper 14 is pivotally connected on the one hand to the leg lever 6 by means of a shaft 15 and on the other hand to the transverse member 8 by means of a shaft 16. A telescopic strut 17 with internal locking in the compressed position provides bracing for the undercarriage in the extended position. The strut is pivotally connected to the leg lever 6 at 18 and to the aircraft at 19, the pivot points 7' and 19 lying substantially on a horizontal straight line parallel to the plane of symmetry of the aircraft. A jack 20 provides for retraction and extension of the undercarriage. The jack 20 is pivotally connected at 21 to the transverse member 8 and at 22 to the aircraft.

The above described undercarriage operates in the following manner:

In the undercarriage extended position, as shown in full lines in the drawings, the telescopic strut 17 is locked and for this reason acts like a rod. Since the pivot mounting 7 of the leg lever and the pivot mounting 19 of the telescopic strut 17 on the aircraft are on a horizontal straight line parallel to the plane of symmetry of the aircraft, the leg lever 6 moves virtually in the vertical plane which contains it, when the damper 14 operates, so that the wheels 2 and 3 remain parallel to the axis of the aircraft, as is shown by the position of the wheels in broken lines in FIG. 1. Moreover, as the leg lever 6 and the rod 11 substantially form a parallelogram, and as the straight line through the pivot connections 5 and 10 always remains parallel to the straight line through the pivot connections 7 and 16, the wheels 2 and 3 consequently remain vertical during operation of the damper 14. Because of the inclination of the leg lever 6, the track of the undercarriages increases when the damper 14 is compressed, as shown by the position of the wheels in broken lines in FIG. 1. This increase in track contributes to the damping of energy upon landing by rubbing of the tires, and also contributes to improving the stability of the aircraft during maneuvering on the ground.

To raise the undercarriage, the hydraulic fluid unlocks the telescopic strut 17 and causes extension of the jack 20. The transverse member 8 and consequently the leg lever 6 and the arm 4 carrying the wheels can then pivot forwardly of the aircraft about the shaft 9 of the transverse member 8. In this movement, because the mounting point 13 of the rod 11 on the aircraft is not on the pivot hinge 9, the arm 4 and consequently the wheels 2 and 3 are pivoted, in a counter-clockwise direction in FIG. 1, so that the axis D of the leg lever 6 and the axis D' of the arm 4 which formed a break in line in the extended position of the undercarriage, are virtually aligned at the end of the undercarriage retraction, in the retracted position shown in chain-dotted lines in the drawings. During retraction of the undercarriage, the damper 14 remains relaxed, so that the triangle formed by the points 7, 15 and 16 remains undeformable.

The arrangement according to the invention also affords the additional advantage that since retraction of the undercarriage train is towards the front of the aircraft, it will conversely be extended rearwardly of the aircraft and thus under the combined action of gravity and the air flow.

Many detail modifications can, of course, be made in the embodiment described without thereby departing from the scope of the invention.

We claim:

1. An undercarriage assembly for an aircraft having a longitudinal plane of symmetry, said undercarriage assembly comprising a transverse hinge member journalled in said aircraft in an oblique position with respect to the plane of symmetry thereof, a lateral leg lever having an upper end pivotably connected to said transverse hinge member, said undercarriage assembly having retracted and extended positions, said lateral leg lever in the extended position being inclined outwardly, a support arm for at least one wheel, said support arm including a portion which is vertical in the extended position and has an upper end pivotably connected to said lateral leg lever to form an angle therewith, said support arm including an inclined portion extending upwardly and outwardly from said vertical portion, an independent damper connecting the lateral leg lever to said transverse hinge member, and a rod having opposite ends one being pivotally connected to said inclined portion at the free end thereof and the other to the fuselage of the aircraft at a point spaced from the axis of said hinge member, the connection of said rod to said inclined portion and to the fuselage, forming, with the pivotal connec-tions of the lateral leg lever to said arm and to said hinge member, the corner points of a parallelogram.

2. An undercarriage assembly according to claim 1 wherein the transverse hinge member is mounted inside the aircraft.

3. An undercarriage assembly according to claim 2 wherein the pivotal connection of the arm to said lateral lever is, in the extended position, parallel to the longitudinal axis of the aircraft, and positioned above the wheel, said rod being disposed in the extended position above said lateral leg lever.

4. An undercarriage assembly according to claim 2 further comprising a telescopic strut with internal locking pivotally connected to said lateral leg lever and to the aircraft such that the last said pivotal connection and the pivotal connection of the lateral leg lever to the transverse hinge member are on a substantially horizontal straight line parallel to the plane of symmetry of the aircraft.

5. An undercarriage assembly according to claim 4 wherein said telescopic strut is locked in compressed condition, in the extended position of the undercarriage, retraction of the undercarriage being effected forwardly of the aircraft.

6. An undercarriage assembly according to claim 1 further comprising an operating jack pivotally connected to the transverse hinge member and to the aircraft.

* * * * *